Oct. 22, 1940.　　　M. FOULD　　　2,218,675

CONSTRUCTION OF COMPOSITE WALLS

Filed Jan. 28, 1938

Inventor
Maurice Fould
By Graton, Cole, Ward & Grindle
Attorneys

Patented Oct. 22, 1940

2,218,675

UNITED STATES PATENT OFFICE 2,218,675

CONSTRUCTION OF COMPOSITE WALLS

Maurice Fould, Paris, France, assignor to Forges de Strasbourg (Societe Anonyme), Paris, France, a company of France Application January 28, 1938, Serial No. 187,516
In France January 6, 1938

3 Claims. (Cl. 189—34)

The present invention relates to walls, partitions, and other similar building elements which will be hereinafter referred to by the generic name of walls.

The chief object of the present invention is to provide a wall which is strong, light, incombustible, heat insulating, sound insulating, and cheap to erect, and the construction of which permits of eliminating eventually, or at least reducing to a considerable extent the skeleton or framework which, up to this time, had to be made in advance, while dispensing, for the assembly of the wall elements, with the binders usually employed for the construction of walls, such as cement and plaster.

According to an essential feature of the present invention, the composite wall includes at least one metal sheet, smooth, corrugated or ribbed, which constitutes the external or internal facing of the wall and, at the same time, eventually, the framework or skeleton thereof, and a light and insulating pugging. This pugging may be glued or fixed in any other suitable manner to said metal sheet or it may be held at a distance therefrom in such manner as to leave between them an insulating layer of air.

According to another feature of the present invention, this plugging consists of at least one layer of a fabric shaped in such manner as to have a high moment of inertia and made rigid by impregnation or coating with an incombustible plastic composition of matter, such as cement, plaster, a paste chiefly composed of refractory materials, and so on.

On the side opposed to the metal sheet, the pugging may be fitted either with a second metal sheet, which may or not have a carrying action, or with a coating of any suitable material, preferably one having insulating properties.

According to a particularly advantageous embodiment of the present invention, the metallic face or faces of the wall is, or are, made of panels made and assembled in the manner described in the prior U. S. Patent application Ser. No. 63,952, filed February 14, 1936, now Patent No. 2,164,681, granted July 4, 1939.

Other features of the present invention will result from the following detailed description of some specific embodiments thereof.

Preferred embodiments of the present invention will be hereinafter described, with reference to the accompanying drawing, given merely by way of example, and in which.

Figure 1:
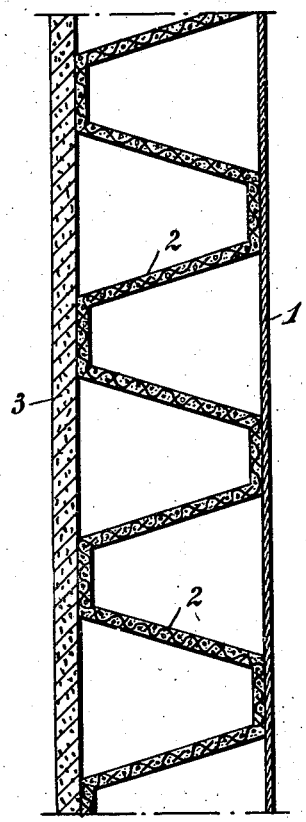
Fig. 1 is a partial vertical section of an embodiment of a composite wall made according to the present invention.

The wall shown by Fig. 1 includes the following parts:

a. A carrying element, acting as framework, constituted by an external facing consisting of a metal sheet 1.

b. A corrugated pugging 2, of linen or jute canvas impregnated with cement, plaster or another binder giving it sufficient strength and rigidity to resist local stresses such as normally encountered by walls of buildings, these stresses being generally those of concussion or lateral pressure accidentally applied to the wall by furniture or persons, and constituting the ordinary hazards of a habitable structure.

c. A plate 3 of an insulating material, for instance wood pulp, forming the internal facing of the wall.

These various elements are assembled together by gluing, for instance by means of a special glue of a known type, consisting chiefly of an alkaline silicate and magnesium carbonate, with the addition of glass powder and fibers of asbestos, or by means of a glue consisting chiefly of casein and lime.

In a wall made as above described, the only element which supports structural stresses and loads is the metal sheet facing 1. The floorings are secured to this element of the wall, for instance by means of angle irons or other sectional irons.

Figure 2:
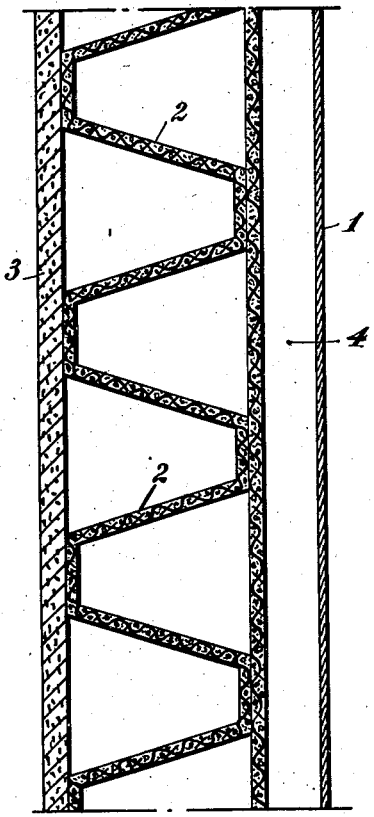
Fig. 2 is a similar view of another embodiment of the invention.

In the embodiment shown by Fig. 2, the wall includes the same elements as above described. But in this case the pugging 2, which is for instance analogous to that described with reference to Fig. 1, is held apart from the carrying facing 1, in such manner as to leave a layer of air between said pugging and said facing, as shown at 4. In this embodiment, the pugging may be mounted independently of the wall facing 1. For instance these two elements may be fixed to upper and lower holding members by any suitable means, such as profiled irons, or transversal holding members may be secured both to the pugging and to the metal facing 1 by any suitable means, such as glueing or the like.

Wall elements constituted as disclosed may be preformed and assembled in situ through mutual interengagement so as to form a rigid whole without any complementary frame being required.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A thick hollow unitary prefabricated soundproof wall-forming assembly, consisting of a single self-supporting sheet metal panel adapted to carry the structural load imparted to the wall, and a thick rigid cellular lining structure made of relatively stiff light-weight non-metallic insulating material, said structure comprising an undulating framework secured to said metal panel, and a facing panel formed of similar stiff light-weight non-metallic material and secured to said framework at the side thereof remote from the metal sheet, said lining structure adapted to withstand local stresses ordinarily imparted to a wall in the usual building construction.

2. A thick hollow unitary prefabricated soundproof wall-forming assembly, consisting of a self-supporting sheet metal panel adapted to carry the structural load imparted to the wall, and a thick rigid cellular lining structure made of relatively stiff light-weight non-metallic insulating material, said structure comprising an undulating framework, means for securing said framework in spaced relation to said metal panel, and a facing panel formed of similar stiff light-weight non-metallic material and secured to said framework at the side thereof remote from the metal sheet, said lining structure adapted to withstand local stresses ordinarily imparted to a wall in the usual building construction.

3. A thick hollow unitary prefabricated soundproof wall-forming assembly, consisting of a self-supporting sheet metal panel adapted to carry the structural load imparted to the wall, and a thick rigid cellular lining structure comprising a framework composed of a sheet of stiff light-weight insulating material made of fabric impregnated with a hardened plastic material and disposed in an undulating or zigzag arrangement and secured to said metal panel, said framework being of such rigidity as to withstand local stresses to which the surface of the wall of a building is normally subjected but insufficient to support the structure, and a facing element secured to said framework to provide a suitable finish for the wall surface on the side opposite the metal supporting panel, said facing element also being incapable of sustaining structural or wall supporting stresses.

MAURICE FOULD.